(12) United States Patent
Becquerelle et al.

(10) Patent No.: US 7,728,447 B2
(45) Date of Patent: Jun. 1, 2010

(54) DISTRIBUTED ARCHITECTURE FOR A GAS-TURBINE STARTER/GENERATOR

(75) Inventors: Samuel Raymond Germain Becquerelle, Montigny le Bretonneux (FR); Jean Pierre Galivel, Savigny le Temple (FR)

(73) Assignee: Hispano Suiza, Colombes (FR)

( * ) Notice: Subject to any disclaimer, the term of this patent is extended or adjusted under 35 U.S.C. 154(b) by 121 days.

(21) Appl. No.: 12/021,593

(22) Filed: Jan. 29, 2008

(65) Prior Publication Data

US 2008/0238098 A1 Oct. 2, 2008

(30) Foreign Application Priority Data

Jan. 31, 2007 (FR) .................................. 07 52985

(51) Int. Cl.
*F02N 11/04* (2006.01)
(52) U.S. Cl. ........................ 290/3; 310/67 R
(58) Field of Classification Search ............ 290/3
See application file for complete search history.

(56) References Cited

U.S. PATENT DOCUMENTS

| | | | | |
|---|---|---|---|---|
| 2,395,443 A * | 2/1946 | Barraja-Frauenfelder et al. | 290/32 |
| 2,897,383 A | 7/1959 | Barrows et al. | |
| 3,465,162 A * | 9/1969 | Oprecht ....................... | 290/4 R |
| 3,577,002 A * | 5/1971 | Hall et al. ...................... | 290/46 |
| 3,590,262 A * | 6/1971 | Sheffield et al. ............... | 290/46 |
| 4,473,752 A * | 9/1984 | Cronin ....................... | 290/38 R |
| 4,609,842 A | 9/1986 | Aleem et al. | |
| 4,862,009 A * | 8/1989 | King ........................... | 290/22 |
| 5,418,400 A * | 5/1995 | Stockton ....................... | 290/46 |
| 5,424,593 A | 6/1995 | Vaghani et al. | |
| 5,751,070 A * | 5/1998 | Nagao et al. ................... | 290/46 |
| 5,990,590 A * | 11/1999 | Roesel et al. ............... | 310/113 |
| 6,032,632 A * | 3/2000 | Bolenz et al. ............ | 123/179.3 |
| 2003/0189375 A1* | 10/2003 | Raad ........................... | 303/20 |
| 2004/0107703 A1 | 6/2004 | Gustafson | |
| 2004/0183308 A1* | 9/2004 | Xu et al. ....................... | 290/52 |
| 2006/0012179 A1* | 1/2006 | Thomson et al. ............... | 290/34 |
| 2006/0087123 A1* | 4/2006 | Stout et al. ..................... | 290/2 |
| 2007/0040383 A1* | 2/2007 | Mehl et al. ................ | 290/36 R |

FOREIGN PATENT DOCUMENTS

| | | |
|---|---|---|
| DE | 199 35 074 A1 | 2/2000 |
| FR | 1311201 | 12/1962 |
| FR | 2011493 | 3/1970 |
| GB | 870851 | 6/1961 |
| WO | WO 03/021750 A1 | 3/2003 |

\* cited by examiner

*Primary Examiner*—Joseph Waks
(74) *Attorney, Agent, or Firm*—Oblon, Spivak, McClelland, Maier & Neustadt, L.L.P.

(57) ABSTRACT

An assembly includes a gearbox for a gas turbine having a geartrain, and at least one starter/generator coupled mechanically to the gearbox. The starter/generator includes a generator module with a first casing, a generator housed in the first casing, and a first shaft constrained to rotate with the rotor of the generator, projecting from the first casing, and carrying a first mechanical coupling member; an exciter module, including a second casing, an exciter housed in the second casing, and a second shaft distinct from the first shaft, constrained to rotate with the rotor of the exciter, projecting from the second casing, and carrying a second mechanical coupling member; and an electrical connection including a rectifier and at least one connector for connecting the secondary circuit of the exciter to the primary circuit of the generator.

12 Claims, 7 Drawing Sheets

DISTRIBUTED ARCHITECTURE FOR A GAS-TURBINE STARTER/GENERATOR

BACKGROUND OF THE INVENTION

The invention relates to gas turbines, and more particularly to mounting a starter/generator (S/G) on a gearbox, or an accessory gearbox. The field of application of the invention is that of gas turbines for aeroengines for airplanes or helicopters, and also that of auxiliary power units (APUs).

In a gas turbine, certain pieces of equipment or "accessories" are driven by a mechanical transmission using mechanical power taken from a turbine shaft. The mechanical transmission includes a set of gearwheels housed in a casing and is referred to as a gearbox or as an accessory gearbox. Accessories include in particular various pumps for producing hydraulic energy, of for delivering fuel or lubricant, and also one or more electrical S/Gs.

While a gas turbine is in operation, the or each S/G acts as an electricity generator and produces electricity that powers one or more electricity distribution centers for the airplane or the helicopter and its engine(s).

When the gas turbine is stopped, an S/G can be used as a starter by being connected to an external power supply in order to set the gas turbine into operation by rotating the turbine shaft to which the gearbox is connected.

An S/G of known type comprises a main synchronous generator having a main rotor and a main stator, together with an exciter having a rotor with a secondary magnetic circuit and a stator with a primary magnetic circuit. The secondary circuit of the exciter powers the main rotor of the synchronous generator via a rectifier such as a rotary diode bridge. In electricity generation mode, the secondary circuit of the synchronous generator produces an alternating voltage as a result of the primary circuit being rotated under power from direct current (DC) delivered by the diode bridge of the exciter, the frequency of the alternating voltage that is produced varying as a function of the speed of rotation. In starting mode, the main rotor powered by the exciter and the main stator powered by an alternating voltage from an external source act like a synchronous motor.

Such a known S/G is a relatively bulky piece of equipment that is usually mounted in a special casing on one side of the gearbox and that is mechanically connected thereto. This leads to occupying a large amount of space and to presenting a significant weight that is cantilevered out and therefore requires attachment means of sufficient strength to enable it to be mounted on the gearbox.

OBJECT AND SUMMARY OF THE INVENTION

An object of the present invention is to propose an S/G architecture that enables the weight and the bulk thereof to be reduced while continuing to be easy to dismantle for maintenance or repair purposes.

This object is achieved by means of a starter/generator for a gas turbine, the starter/generator comprising a generator with a rotor forming a primary magnetic circuit and a stator forming a secondary magnetic circuit, and an exciter with a stator forming a primary magnetic circuit and a rotor forming a secondary magnetic circuit, the starter/generator comprising:

a first module or generator module comprising a first casing, the generator housed in the first casing and a first shaft constrained to rotate with the rotor of the generator projecting from the first casing and carrying a first mechanical coupling member;

a second module or exciter module, comprising a second casing, the exciter housed in the second casing, and a second shaft secured to rotate with the rotor of the exciter, the second shaft being distinct from the first shaft, projecting from the second casing, and carrying a second mechanical coupling member; and an electrical connection comprising a rectifier and at least one connector for connecting the secondary circuit of the exciter to the primary circuit of the generator.

Because of the modular architecture of the S/G, the generator and exciter modules having distinct mechanical coupling shafts can be mounted separately on a gearbox. Thus, the weight cantilevered out from the gearbox can be made smaller. In addition, because it is possible to disconnect the electrical connection, it is possible to remove solely the generator module or solely the exciter module for maintenance or replacement purposes.

According to one feature, the electrical connection is housed at least in part inside the first and second shafts, which shafts may be hollow or provided with a passage for passing the electrical connection.

According to another feature, the S/G further comprises a permanent magnet generator having a rotor carrying permanent magnets and a stator forming a secondary circuit, and the permanent magnet generator forms part of one of said modules, being housed inside the casing of that module with its rotor constrained to rotate with the shaft of the module. Preferably, the permanent magnet generator forms part of the exciter module.

At least one of the modules may be associated with a device specific to the module for feeding it with cooling/lubricating liquid. Under such circumstances, and advantageously, the shaft of the module associated with a specific device for feeding it with cooling/lubricating liquid projects from the casing of said module through an opening that is provided with a sealing device.

The invention also provides an assembly comprising a gas turbine gearbox having a geartrain with a plurality of gearwheels housed in a casing and at least one S/G coupled to the gearbox, the S/G being as defined above with the first and second coupling members being coupled to one of the gearwheels of the gearbox, and each of the first and second casings being connected to the casing of the gearbox.

In an embodiment, the first and second shafts share a common axis and are coupled to a common gearwheel of the gearbox, and the casings of the first and second modules are separately connected to the casing of the gearbox on opposite sides thereof.

In another embodiment, the first and second shafts are not on a common axis and the first and second coupling members are coupled to respective distinct gearwheels of the gearbox. The casings of the first and second modules are connected separately to the casing of the gearbox on the same side thereof or on two opposite sides thereof. In this other embodiment, the electrical connection may comprise a first rotary electrical coupling having stationary contacts and rotary contacts connected to the secondary circuit of the exciter, a second rotary electrical coupling having stationary contacts and rotary contacts connected to the primary circuit of the generator, and a stationary connection connecting the stationary contacts of the first rotary coupling to the respective stationary contacts of the second rotary coupling. In which case, the rectifier, such as a diode bridge, is advantageously inserted in the stationary connection in order to avoid being exposed to the stresses generated by rotation.

Under all circumstances, at least one of the modules can be fed with cooling/lubricating liquid from a cooling/lubricating liquid circuit of the gearbox.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 1:
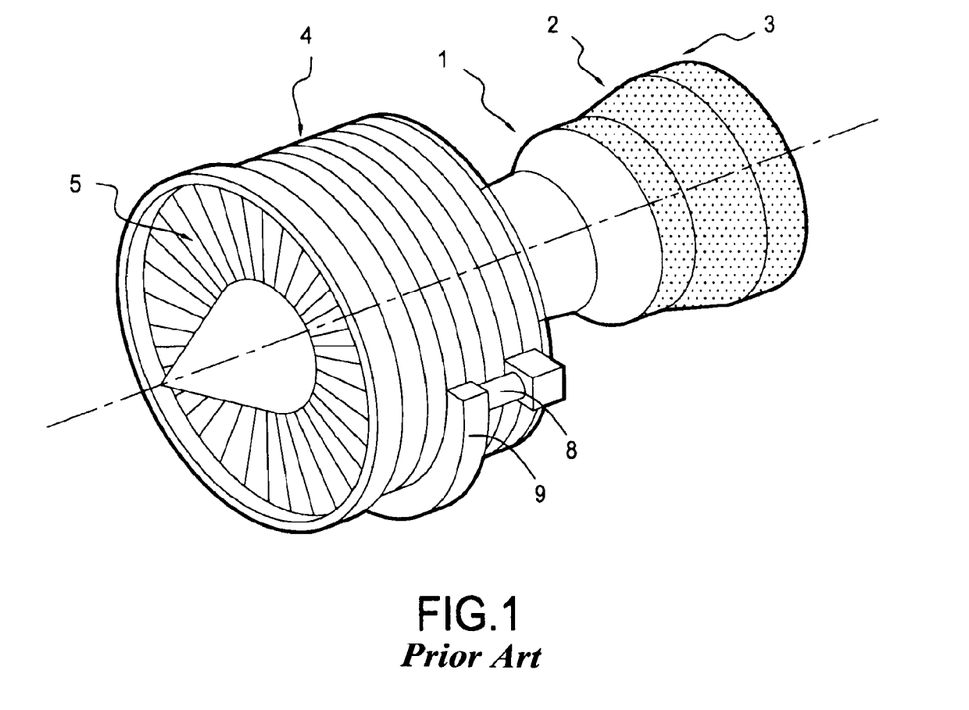
FIG. 1 is a highly simplified diagram of a gas turbine engine.

A field of application of the invention is that of gas turbine aeroengines for airplanes, of the kind shown very diagrammatically in FIG. 1, but the invention is nevertheless applicable to other gas turbine aeroengines, typically to helicopter engines, and also to auxiliary gas turbine power units.

The engine of FIG. 1 comprises a combustion chamber 1, with combustion gas from the chamber 1 driving a high pressure turbine 2 and a low pressure turbine 3. The turbine 2 is coupled by a shaft to a high pressure compressor 4 that feeds the combustion chamber 1 with air under pressure, while the turbine 3 is coupled by another shaft to a fan 5 at the inlet to the engine.

A gearbox 9 or accessory gearbox is connected via a mechanical power takeoff 8 to a turbine shaft and comprises a set of gearwheels for driving various accessories, including at least one (and generally two) starter/generators (S/Gs).

Figure 2:
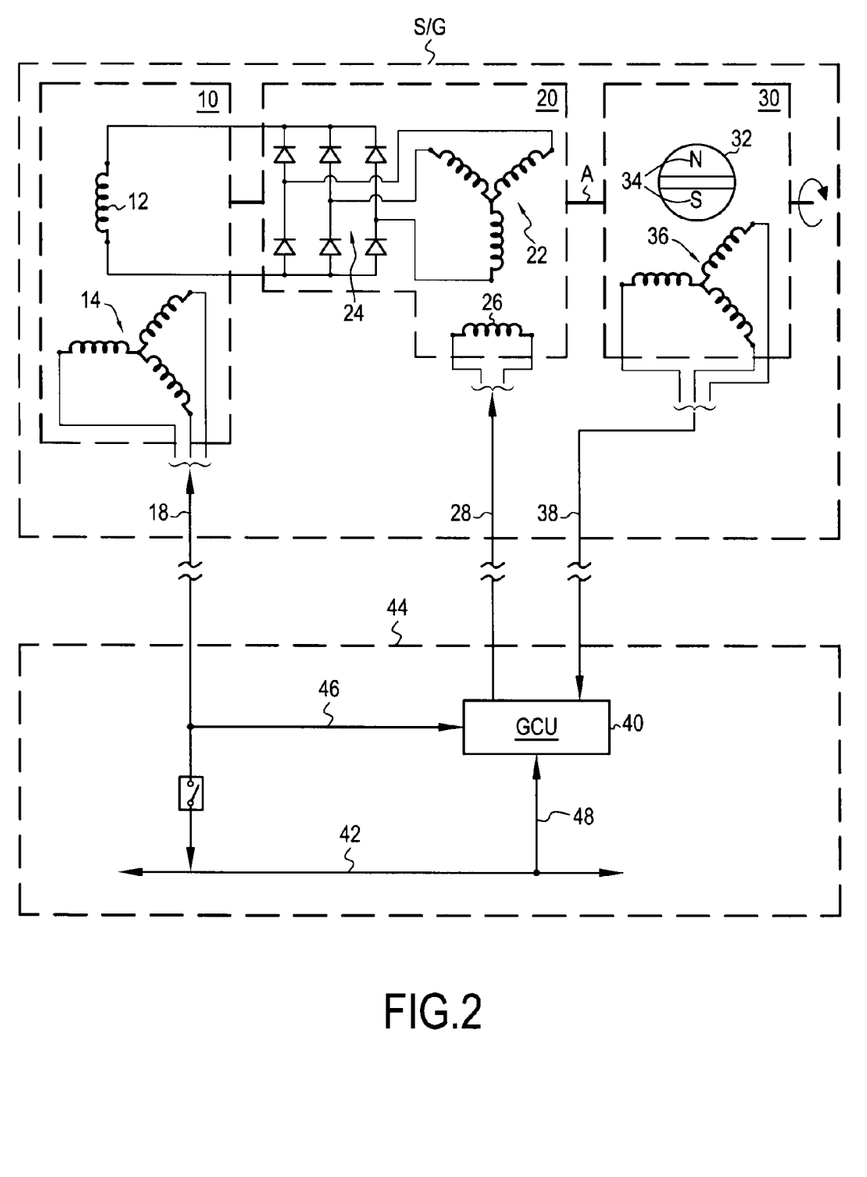
FIG. 2 is a simplified electrical circuit diagram of an embodiment of a starter-generator.

FIG. 2 is a simplified general electrical circuit diagram of S/G comprising a synchronous generator 10, an exciter 20, and a permanent magnet generator (PMG) 30, having rotary portions or rotors that share a common axis, being mounted on a common rotary shaft of axis A.

The synchronous generator 10 constituting the main machine has a main rotor forming a primary magnetic circuit 12 and a main stator forming a secondary magnetic circuit 14. The exciter 20 has a rotor forming a secondary magnetic circuit 22 that is connected to a rectifier such as a rotary diode bride 24, and a stator forming a primary magnetic circuit 26. The PMG 30 has a rotor 32 carrying permanent magnets 34 and a stator 36 forming a secondary magnetic circuit.

In electricity-generation mode, the primary circuit 12 of the synchronous generator that is connected to the rectifier 24 receives direct current (DC) produced by the exciter, and alternating current (AC) is produced by the secondary circuit 14 and is delivered via a harness 18 to an AC bus 42 of an electricity distribution circuit such as an on-board network 44 of an airplane or a helicopter. A generator control unit (GCU) or regulator circuit 40 is powered by the PMG 30 via a harness 38. The circuit 40 receives information via a line 46 that is representative of the value of the AC voltage output by the generator 10, and it controls the DC delivered to the primary circuit 26 of the exciter via a harness 28 so as to regulate the amplitude of the output voltage to a reference value, this voltage being at a frequency that is variable as a function of the speed of rotation of the shaft A.

In starter mode, the regulator circuit 40 is fed with voltage via a line 48 from the AC bus 42 (or from some other source), in order to ensure that it can operate and in order to power the primary circuit 26 of the exciter with AC. Simultaneously, the secondary circuit 14 is powered with AC by the harness 18 from the AC bus 42 (or from some other source), with operation then being as a synchronous motor.

An S/G as described above, and its operation and regulation by means of a GCU are known in themselves, with the PMG, the exciter, and the synchronous generator, in electrical power generation mode, forming a succession of stages with amplification from one stage to the next. It should be observed that the presence of the PMG is not required if the regulator circuit 40 can be powered from elsewhere. It should also be observed that the functions of the GCU could be integrated in an electronic circuit for regulating the engine, also known as an engine control unit (ECU).

Figure 3:
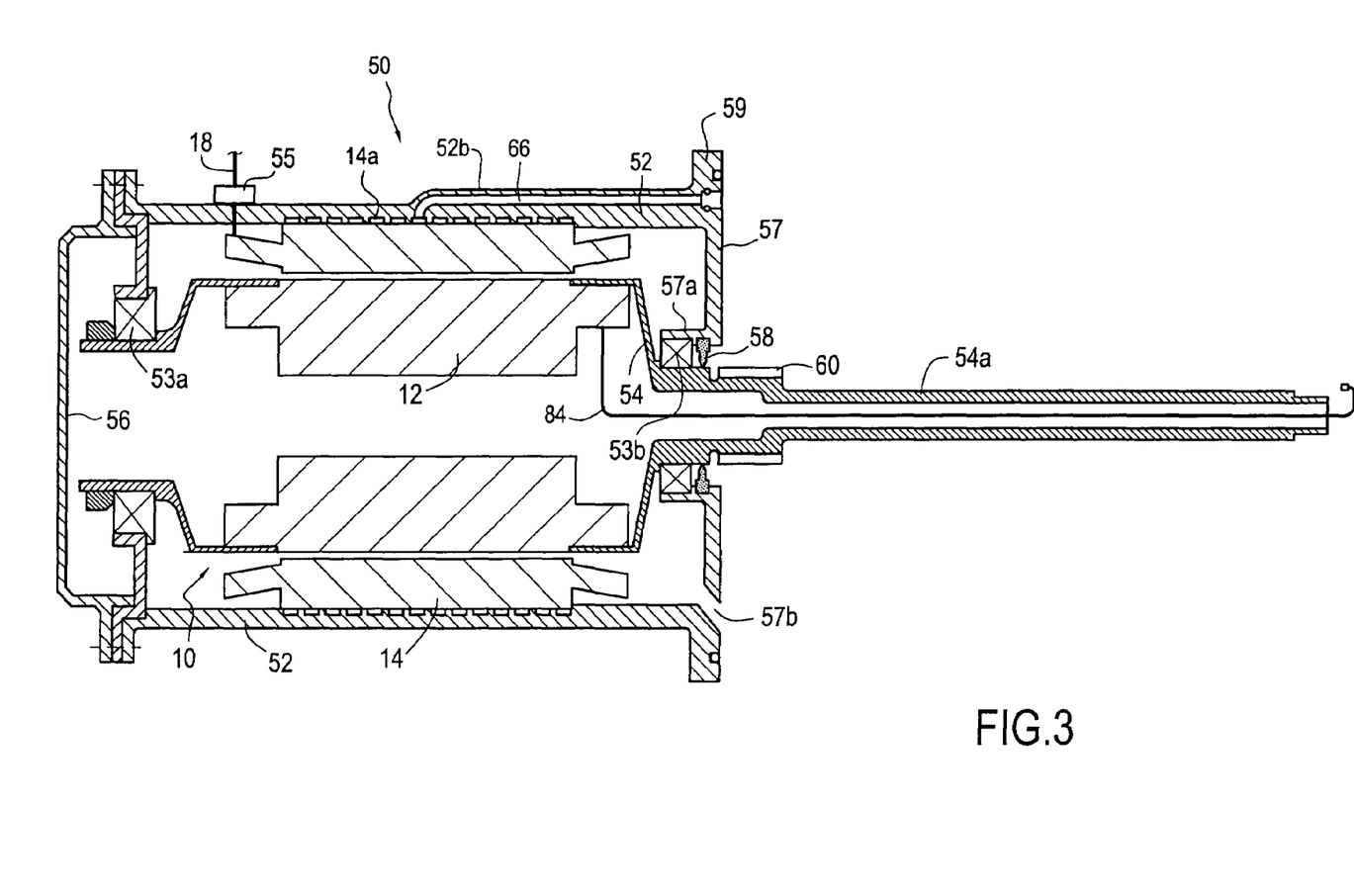
FIG. 3 is an axial section view of a generator module in an embodiment of the invention.
Figure 4:
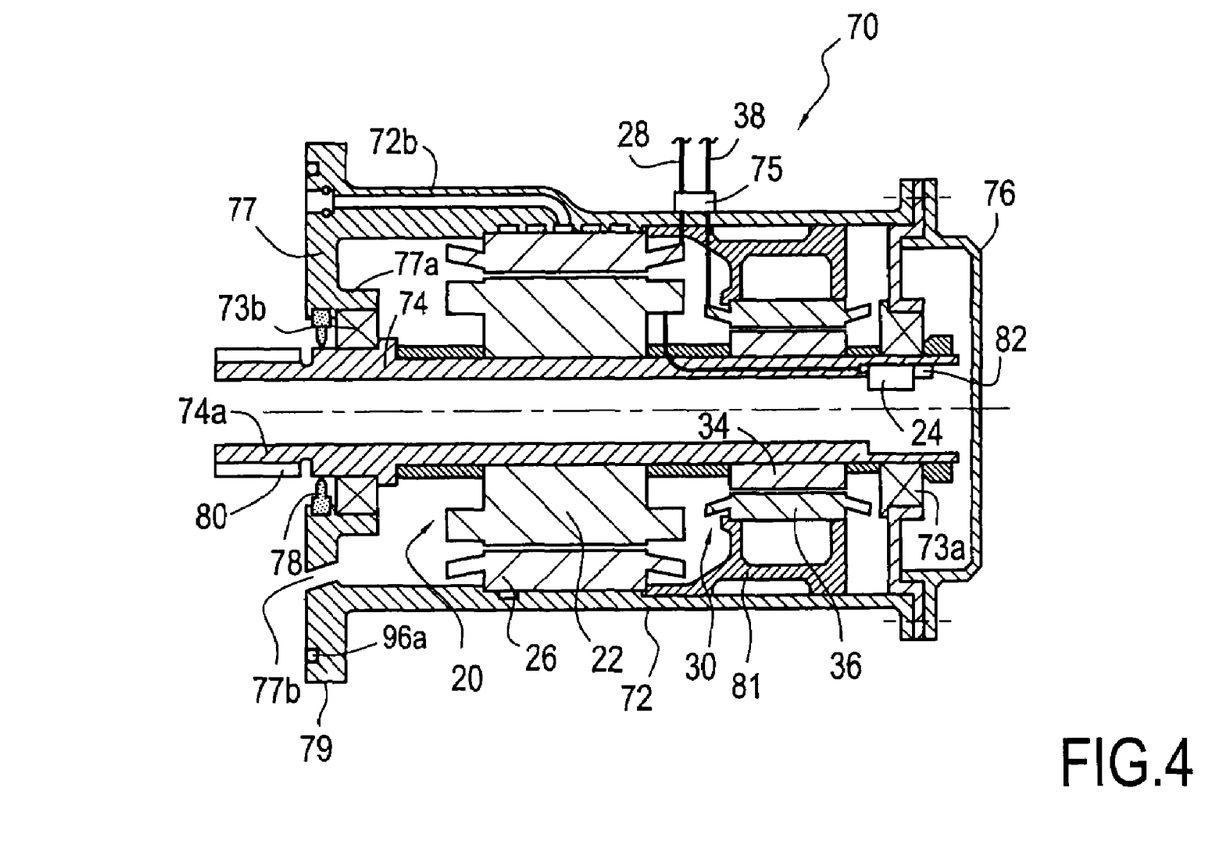
FIG. 4 is an axial section view of an exciter module in an embodiment of the invention.

FIGS. 3 and 4 show embodiments of a generator module 50 and of an exciter module 70 in accordance with the modular architecture of the invention for an S/G.

The generator module 50 comprises a synchronous main generator 10 housed in a box or casing 52. The rotor of the generator carrying the windings of the primary circuit 12 is mounted on a shaft 54 that is supported in the casing 52 by rolling bearings 53a, 53b. The stator of the generator carrying the windings of the secondary circuit 14 is secured to the inside of the casing 52. The harness 18 conveying the voltage that is produced is connected to the secondary circuit 14 by passing through the casing 52 in leaktight manner, or else, as shown, by being connected to a connection block 55, itself connected to the secondary circuit 14. The casing 52 is generally cylindrical in shape and is closed in leaktight manner at a "rear" end, by an end wall 56 that is secured, e.g. by bolts, to the rear end of the casing 52 where the bearing 53a is supported. At its front end, the casing 52 is closed by a wall 57. The wall 57 presents a central opening defined by an annular portion 57a secured to the wall 57. The annular portion 57a carries the bearing 53b and also carries a lip seal 58 having its end bearing against the outside surface of the shaft 54, or any other sealing system, e.g. a rotary gasket or a labyrinth type device.

The shaft 54 projects through the opening in the wall 57 and is extended outside the casing 52 by a portion 54a of small diameter. This portion carries a mechanical coupling member in the form of fluting 60, for example, and it extends beyond the fluting.

The exciter module 70 comprises the exciter 20 and the PMG 30, which are housed in a box or casing 72. The rotor of the exciter, carrying the windings of the secondary circuit 22 is mounted on a shaft 74 supported in the casing 72 by bearings 73a, 73b. The stator of the exciter carrying the windings of the primary circuit 26 is fastened to the inside of the casing 72. The harness 28 conveying the power supply current of the primary circuit 26 is connected thereto by passing through the wall of the casing 72 in leaktight manner, or in the example shown, by being connected to a connection block 75 that is itself connected to the secondary circuit 26.

The casing 72 is generally cylindrical in shape and is closed in leaktight manner at a "rear" end by an end wall 76 that is fastened, e.g. by bolts, to the rear of the casing 72 where the bearing 73a is supported. At its front end, the casing 72 is defined by a wall 77 secured to an annular portion 77a surrounding a central opening. The annular portion 77a carries the bearing 73b and also carries a lip seal 78 having its end bearing against the outside surface of the shaft 24, or any other sealing system such as a rotary gasket or a labyrinth device, for example.

The shaft 74 projects through the opening defined by the wall 77 and extends outside the casing in the form of a portion 74a carrying a mechanical coupling member, e.g. in the form of fluting 80.

In the example shown, the PMG 30 is mounted in the casing 72 between the exciter 20 and the end wall 76. The magnets 34 of the PMG are fastened to the shaft 74, while the windings of the secondary circuit 36 of the PMG are situated facing the magnet 34, being supported by a part 81 fastened to the inside of the casing 72. The current produced by the PMG is transported by the harness 38, which can be connected directly to the primary circuit 36 by passing through the wall of the casing 72 in leaktight manner, or as in the example shown, by being connected to the connection block 75, itself connected to the primary circuit 36.

As mentioned above, it should be observed that the PMG need not be necessary. It is also possible to integrate the PMG in the generator module instead of in the exciter module.

Other elements of the modules 50 and 70 are described with reference also to FIG. 5 which shows the modules mounted on a gearbox 90.

The gearbox 90 comprises a casing 92 containing a gear train 100 and it is mechanically coupled by a power connection to a turbine shaft of a gas turbine such as a gas turbine of an airplane engine or a helicopter engine, or indeed of an APU.

Figure 5:
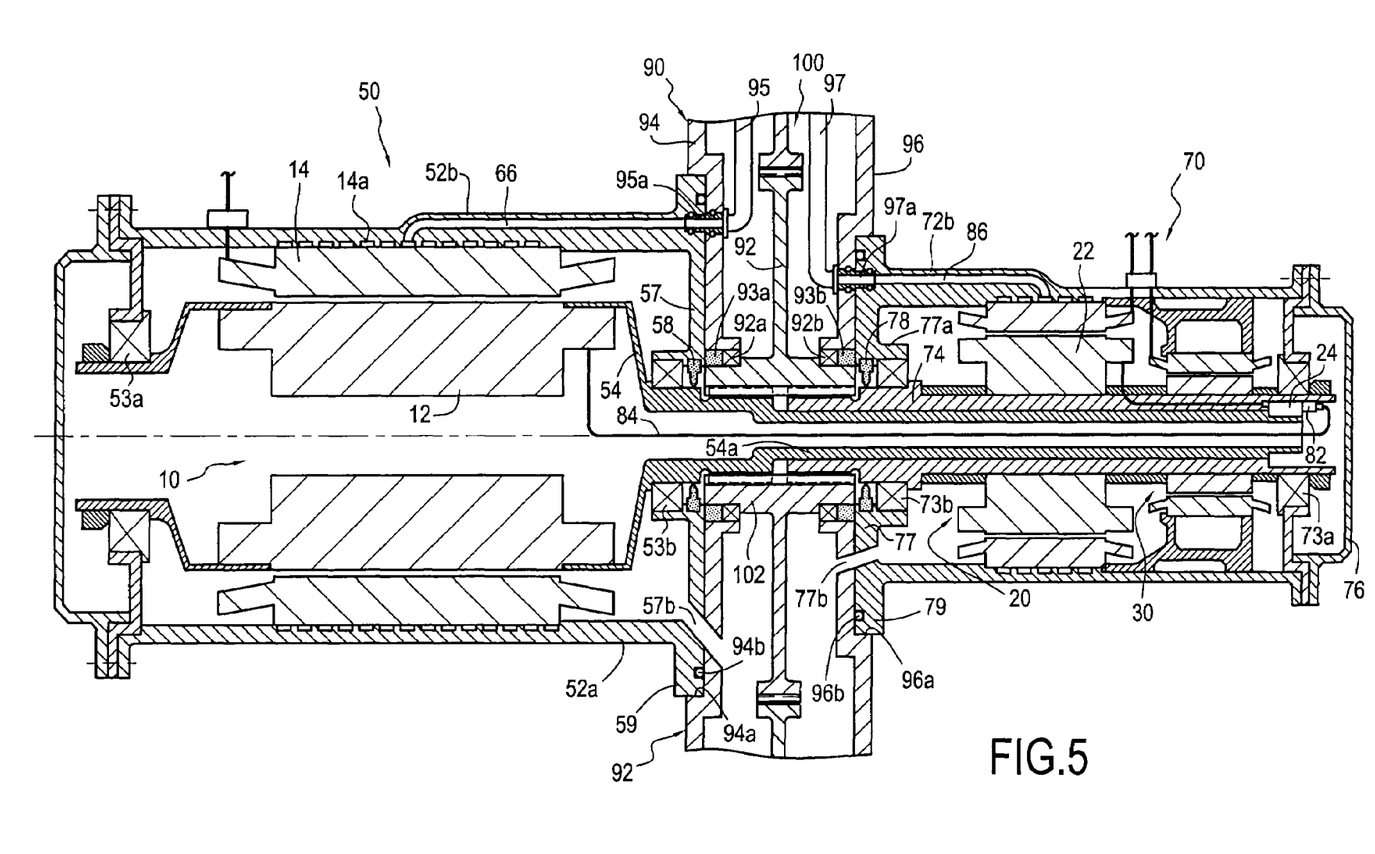
FIG. 5 is a diagrammatic section view showing the generator and exciter modules of FIGS. 3 and 4 mounted on a gearbox in an embodiment of the invention.

In the embodiment of FIG. 5, the modules 50 and 70 are mounted on respective opposite side walls 94 and 96 of the casing 92 and their shafts 54 and 74 are coaxial.

In the example shown, the shaft 74 is hollow and forms a sheath into which the end portion 54a of the shaft 54 penetrates in order to provide good alignment. The sets of fluting 60 and 80 have the same size and shape and they mesh with a common gearwheel 102 of the geartrain 100, the sets of fluting 60 and 80 engaging with complementary fluting formed in an axial passage through the gearwheel 102. The axial collar of the gearwheel 102 is supported in the casing 92 by rolling bearings 92a, 92b, with annular gaskets 93a and 93b being inserted between the bearings 92a, 92b and the front walls of the casings 52 and 72, respectively.

In a variant, only one of the shafts 54, 74 need be coupled directly to the gearwheel 102 by the fluting it carries, with the shafts being coupled together in rotation by a mechanical connection.

In the example shown, the electrical connection between the secondary circuit 22 of the exciter and the primary circuit 12 of the generator passes via the inside of the shafts 74, 54, both of which are hollow. Nevertheless, it is not necessary for the shaft 54 to be hollow, providing it provides a passage for the electrical connection. A connector 82 is fastened to the inside end of the shaft 74 so as to be easily accessible after the end wall 76 has been removed. The connector 82 is connected to the rotary diode bridge 24, which is fastened on the shaft 74 and which is connected to the secondary circuit 22.

A harness 84 passes along the shafts 54, 74 to connect the primary circuit 12 to a plug engaged with the connector 82.

The front end portion of the peripheral wall of the casing 52 penetrates in a setback 94a formed in the wall 94 of the gearbox casing, together with a sealing gasket 94b. In the vicinity of its front end, the casing 52 presents an external flange 59 that comes into abutment against the outside face of the wall 94, with abutment coinciding with the fluting 60 being coupled with the gearwheel 102. The casing 52 is fastened to the casing 92 of the gearbox by bolting the outwardly-directed flange 59 to the wall 94. Other fastening techniques could be adopted, such as a quick coupling technique of conventional type using elastically-deformable locking members.

In similar manner, the front end portion of the peripheral wall of the casing 72 penetrates into a setback 96a formed in the wall 96 of the gearbox casing, together with a sealing gasket 96b. In the vicinity of its front end, the casing 72 presents an outwardly-directed flange 79 that comes into abutment against the outside face of the wall 96, with abutment coinciding with the fluting 80 coupling with the gearwheel 102. The casing 72 is fastened to the casing 92 of the gearbox by bolting the flange 79 to the wall 96 or by other known fastener means, in particular quick coupling means using elastically-deformable locking members.

The modules 50 and 70 are thus mounted on the gearbox 90 with the shafts 54 and 74 being coupled to a gearwheel of the gearbox.

It should be observed that the dispositions of the external terminal portions of the shafts 54 and 74 could be inverted, with the shaft 74 being extended by a terminal portion that penetrates into a sheath formed by the hollow shaft 54.

In conventional manner, the gearbox 90 is fitted with a circuit for feeding it with cooling and lubricating liquid, which circuit includes a tank and a recirculation pump, itself driven by being coupled with the gearbox.

The modules 50 and 70 may be fed with cooling/lubricating liquid from the circuit of the gearbox.

Thus, for this purpose, a duct 66 for feeding the module 50 with cooling/lubricating liquid is provided in a bulge 52b of the casing 52 and opening out into the surface of the flange 59 that faces towards the wall 94 so as to be connected to a pipe 95 that is connected to the cooling/lubricating circuit of the gearbox. A leaktight connection between the duct 66 and the pipe 95 through the wall 94 is provided via a coupling 95a. The duct 66 is connected to a cooling circuit 14a of the secondary circuit 14 of the generator 10, and it is also connected to nozzles (not shown) serving in particular to lubricate the bearings 53a and 53b by forming a mist inside the casing 52.

In similar manner, a duct 86 feeds the module 70 with cooling/lubricating liquid, being provided in a bulge 72b on the casing 72 that opens out into the surface of the flange 79 facing towards the wall 96 in order to be connected to a pipe 97, itself connected to the cooling/lubricating circuit of the gearbox. A leaktight connection between the duct 86 and the pipe 97 through the wall 96 is provided by a coupling 97a. The duct 86 is connected to nozzles (not shown) serving in particular to lubricate the bearings 73a, 73b by forming a mist inside the casing 72.

Passages 57b, 77b are formed through the walls 57-94 and 77-96 in order to recover within the casing 92 the cooling/lubricating liquid from the inside volumes of the casings 52, 72 so as to enable the liquid to be recirculated.

It should be observed that the sealing gaskets 58, 78 could be omitted in this configuration. Nevertheless, they serve to separate the cooling/lubricating liquid circulation circuits within the modules 50, 70 from the circulation circuit within the gearbox, and they thus serve to limit any risk of accidentally emptying out oil residue during maintenance and possibly transferring solid particles between the casing 92 and either of the casings 52, 72.

In a variant, circulation of the cooling/lubricating liquid in one and/or the other of the modules 50, 70 could be achieved by specific self-contained means.

Figure 6:
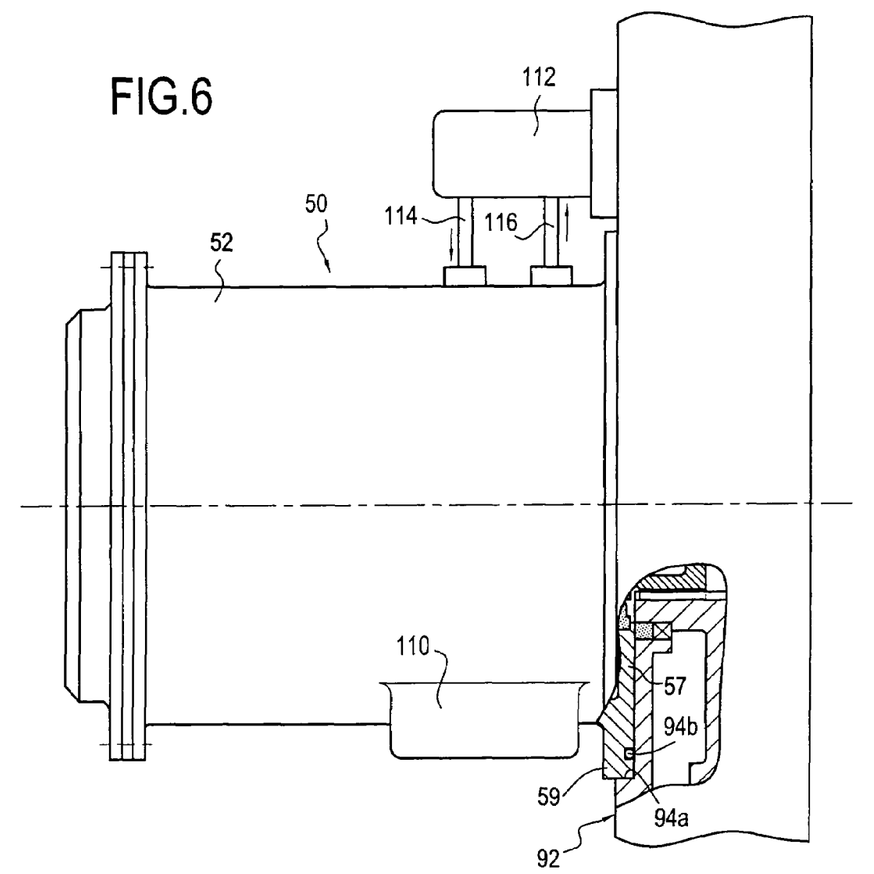
FIG. 6 is a highly diagrammatic view showing a variant embodiment of means for feeding the generator module of FIG. 5 with cooling/lubricating liquid.

Such a disposition is shown very diagrammatically in FIG. 6 for the generator module 50. A similar disposition could be adopted for the exciter module 70.

In this variant, the module 50 is associated with a tank 110 of cooling/lubricating liquid and with a pump 112 for continuously circulating it within the casing 52. The pump feeds the casing 52 via a pipe 114 passing through an opening formed in the wall of the casing, and it is connected to the tank 110 via a return pipe 116. An opening puts the inside volume of the casing 52 into communication with the tank 110.

The sealing gasket 58 isolates the cooling/lubricating liquid circulation circuit inside the casing 52 from the circuit inside the casing 92, the wall 57 not having any opening such as the passage 57b in FIG. 5.

The modular architecture of the S/G with distinct generator and exciter modules is particularly advantageous in that it enables the weights cantilevered out from the casing of the gearbox to be limited in comparison with a complete S/G being assembled on one side thereof. It is easy to mount and remove the generator and exciter modules. Thus, removing one of the modules requires no more than uncoupling the harness 84 from the connector 82 prior to withdrawing the casing from the module. Maintenance and repair operations are simple, and in the event of malfunction, only the faulty module needs to be replaced, and not the entire S/G. As in the embodiment of FIG. 5, it is also possible to share the cooling/lubricating means with those provided for the gearbox.

Figure 7:
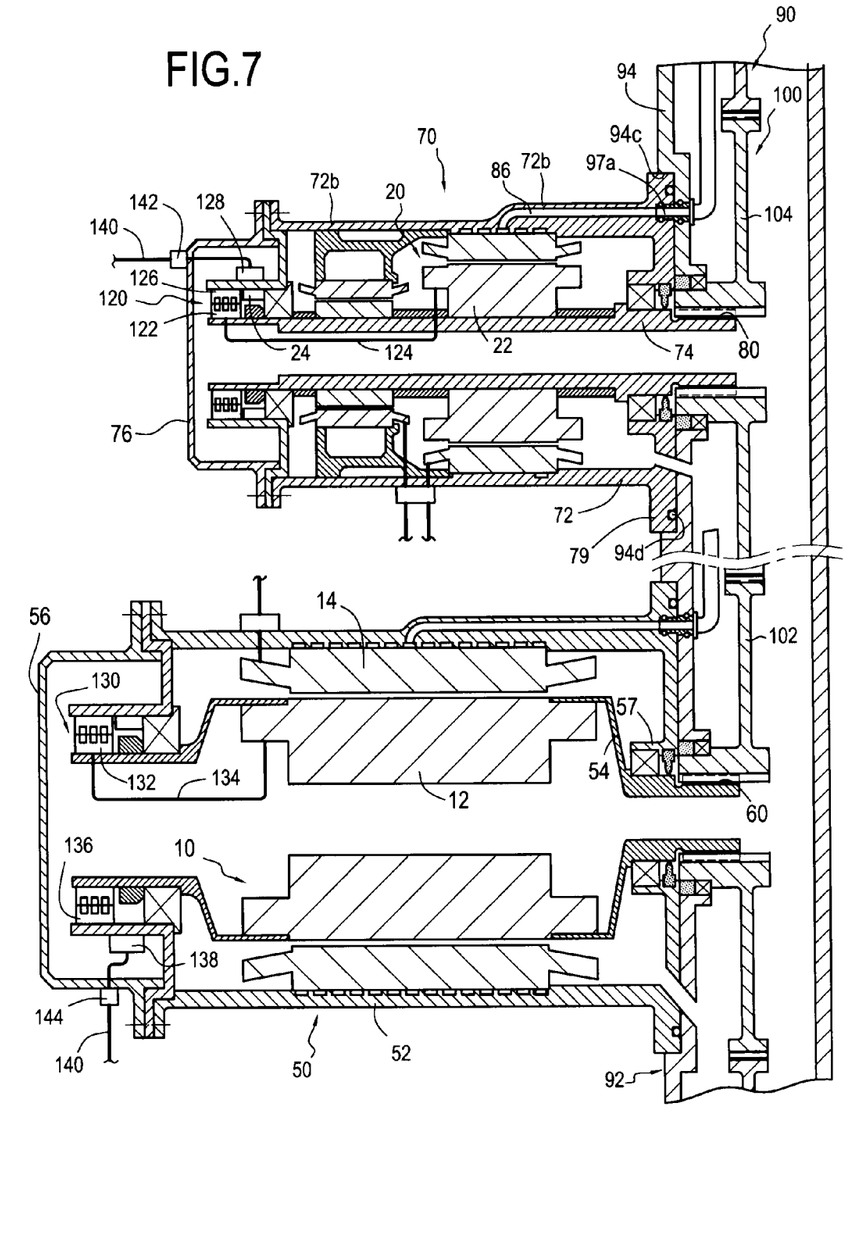
FIG. 7 is a diagrammatic fragmentary view in section showing the generator and exciter modules mounted on a gearbox in another embodiment of the invention.

FIG. 7 shows another embodiment in which the modules 50 and 70 are both mounted on the same side of the gearbox 90 with their shafts 54, 74 lying on different axes (elements that are common to the embodiment of FIG. 5 are given the same numerical references).

Thus, in the embodiment shown in FIG. 7, the generator module 50 is mounted as shown in FIG. 5, while the exciter module 70 is mounted in a manner similar to that shown in FIG. 5, but being fastened to the same wall 94 of the casing 92 of the gearbox. The front portion of the casing 72 with the flange 79 then engages in a setback 94c in the wall 94, together with a sealing gasket 94d. The shaft 54 does not have a terminal portion such as the portion 54a of FIG. 5, and it is open at its end that penetrates into the casing 92.

The sets of fluting 60 and 80 carried by the shafts 54 and 74 then engage in respective gearwheels 102, 104.

Naturally, it is possible to couple the shafts 54, 74 to different gearwheels of the geartrain in the gearbox while also placing the modules 50, 70 on opposite sides of the casing of the gearbox.

It is preferable, although not essential, for the shafts 54, 74 to be driven at the same speed.

The electrical connection between the secondary circuit 22 of the exciter and the primary circuit 12 of the generator requires the use of rotary electrical couplings or rotary joints.

Thus, a rotary coupling 120 has slip rings 122 constrained to rotate with the shaft 74 and connected to the windings of the secondary circuit 22 via respective conductors united in a harness 124 housed in the hollow shaft 74. The coupling 120 has stationary contacts or shoes 126 in rubbing contact against the rings 122. The shoes 126 are connected to the diode bridge 24, itself connected to a connection block 128.

With the generator module, a coupling 130 has slip rings 132 constrained to rotate with the shaft 54 and connected to the windings of the primary circuit 12 via respective conductors united in a harness 134 housed in the hollow shaft 54. The coupling 130 has stationary contacts or shoes 136 in rubbing contact against the rings 132. The shoes 136 are connected to a connection block 138.

The stationary contacts 126 of the coupling 120 are connected to the respective stationary contacts 136 of the coupling 130 via a harness 140 which is provided at its end with plugs for engaging in the connection blocks 142, 144 that are secured to the outsides of the end walls 76, 56 and that are connected to the blocks 128, 138.

Having the shafts 54 and 75 lying on different axes makes it necessary to use rotary electrical couplings or joints or equivalent electrical connection means between the stationary and rotary portions, however it provides greater flexibility in mounting the modules 50, 70 on the gearbox and it enables the diode bridge 24 or some other rectifier to be mounted on a stationary portion that is not subjected to the stresses caused by rotation of the shaft 74.

Since two S/Gs are usually driven by the gearbox, it is also possible to envisage mounting two exciters on one axis for feeding respective generators. The two exciters may be housed in a common casing, with two sets of winding or they may be disposed one behind the other, or in two casings forming two exciter modules on a common axis and mounted on either side of the casing of the gearbox.

What is claimed is:

1. An assembly comprising a gearbox for a gas turbine having a geartrain with a plurality of gearwheels housed in a casing, and at least one starter/generator comprising a generator with a rotor forming a primary magnetic circuit and a stator forming a secondary magnetic circuit, and an exciter with a stator forming a primary magnetic circuit and a rotor forming a secondary magnetic circuit, the starter/generator comprising:

a first module or generator module comprising a first casing connected to the casing of the gearbox, the generator housed in the first casing and a first shaft constrained to rotate with the rotor of the generator projecting from the first casing and carrying a first mechanical coupling member;

a second module or exciter module, comprising a second casing connected to the casing of the gearbox, the exciter housed in the second casing, and a second shaft constrained to rotate with the rotor of the exciter, the second shaft being distinct from the first shaft, projecting from the second casing, and carrying a second mechanical coupling member; and an electrical connection comprising a rectifier and at least one connector for connecting the secondary circuit of the exciter to the primary circuit of the generator, wherein the first and second shafts share a common axis and are coupled to a common gearwheel of the gearbox, and the casings of the first and second modules are separately connected to the casing of the gearbox on opposite sides thereof.

2. The assembly according to claim 1, wherein the electrical connection is housed at least in part within the shafts.

3. The assembly according to claim 1, further comprising a permanent magnet generator having a rotor carrying permanent magnets and a stator forming a secondary circuit, wherein the permanent magnet generator forms part of one of said modules, is housed inside the casing of the module, and has its rotor constrained to rotate with the shaft of that module.

4. The assembly according to claim 3, wherein the permanent magnet generator forms part of the exciter module.

5. The assembly according to claim 1, wherein at least one of the modules is associated with a device specific to the module for feeding it with cooling/lubricating liquid.

6. The assembly according to claim 5, wherein the shaft of the module associated with a specific device for feeding it with cooling/lubricating liquid projects from the casing of said module through an opening that is provided with a sealing device.

7. An assembly according to claim 1, wherein at least one of the modules is fed with cooling/lubricating liquid from a cooling/lubricating liquid circuit of the gearbox.

8. A gas turbine fitted with an assembly according to claim 1.

9. An assembly comprising a gearbox for a gas turbine having a geartrain with a plurality of gearwheels housed in a casing, and at least one starter/generator comprising a generator with a rotor forming a primary magnetic circuit and a stator forming a secondary magnetic circuit, and an exciter with a stator forming a primary magnetic circuit and a rotor forming a secondary magnetic circuit, the starter/generator comprising:
- a first module or generator module comprising a first casing connected to the casing of the gearbox, the generator housed in the first casing and a first shaft constrained to rotate with the rotor of the generator projecting from the first casing and carrying a first mechanical coupling member;
- a second module or exciter module, comprising a second casing connected to the casing of the gearbox, the exciter housed in the second casing, and a second shaft constrained to rotate with the rotor of the exciter, the second shaft being distinct from the first shaft, projecting from the second casing, and carrying a second mechanical coupling member; and
- an electrical connection comprising a rectifier and at least one connector for connecting the secondary circuit of the exciter to the primary circuit of the generator, wherein the first and second shafts have not a common axis, and
- wherein the electrical connection comprises a first rotary electrical coupling having stationary contacts and rotary contacts connected to the secondary circuit of the exciter, a second rotary electrical coupling having stationary contacts and rotary contacts connected to the primary circuit of the generator, and a stationary connection connecting the stationary contacts of the first rotary coupling to the respective stationary contacts of the second rotary coupling.

10. An assembly according to claim 9, wherein the rectifier is inserted in the stationary connection.

11. An assembly according to claim 9, wherein at least one of the modules is fed with cooling/lubricating liquid from a cooling/lubricating liquid circuit of the gearbox.

12. A gas turbine fitted with an assembly according to claim 9.

* * * * *